INVENTORS
HENRY HOFFMANN
JAMES BARBIERI
BY
ATTORNEY
Richard J Killoren
AGENT

Feb. 13, 1962  H. HOFFMANN, JR., ET AL  3,021,389
TELE-MAP SYSTEM
Filed Dec. 19, 1958  5 Sheets-Sheet 4

INVENTORS
HENRY HOFFMANN
JAMES BARBIERI
BY
ATTORNEY
Richard J Killore
AGENT

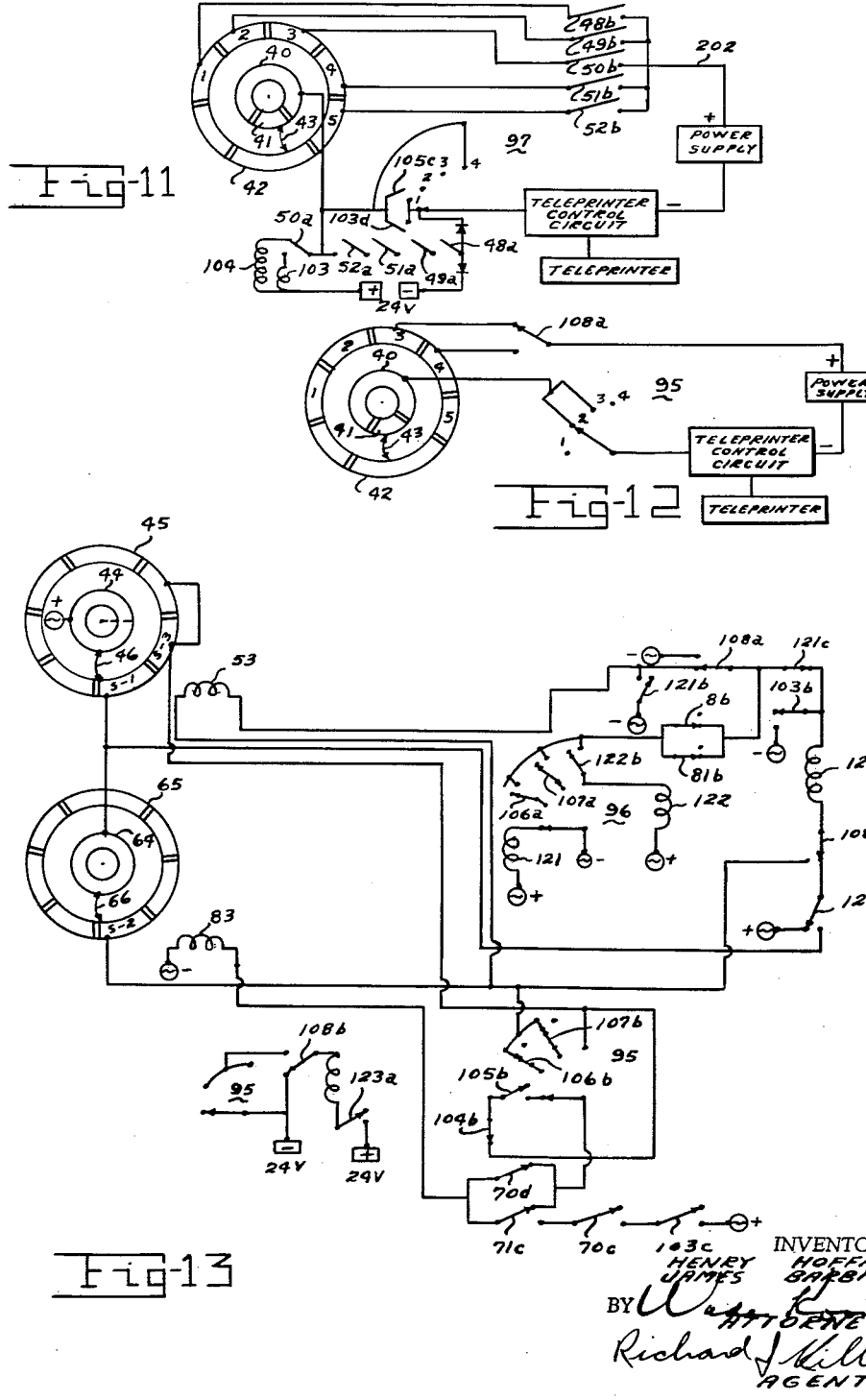

3,021,389
TELE-MAP SYSTEM

Henry Hoffmann, Jr., 2015 W. Madison St., Rome, N.Y., and James Barbieri, 132 Knollwood Circle, Waterbury, Conn.
Filed Dec. 19, 1958, Ser. No. 781,813
13 Claims. (Cl. 178—23)
(Granted under Title 35, U.S. Code (1952), sec. 266)

The invention described herein may be manufactured and used by or for the United States Government for governmental purposes without payment to us of any royalty thereon.

This invention relates to a system for transmitting line drawing data, such as map information over standard teletypewriter communication facilities.

One object of the invention is to provide a system for transmitting line drawing data over standard teletypewriter communication facilities which requires much less sending time than would be required to send the same information by facsimile or by using standard teletypewriter procedure to send the map information for each coordinate by indicating whether or not information exists at that point.

This and other objects will be more fully understood from the following detailed description wherein:

FIG. 6 is a circuit schematic showing the comparison and programming circuit used in the decoder of FIG. 1;

FIG. 11 is a circuit schematic showing the transmitter commutator readout circuit used for the decoder of FIG. 1;

FIG. 12 is a circuit schematic showing the comparison commutator readout circuit for the decoder of FIG. 1; and FIG. 13 is a circuit schematic showing the sequential operation of the stepping switches as used in the decoder of FIG. 1.

Figure 1:
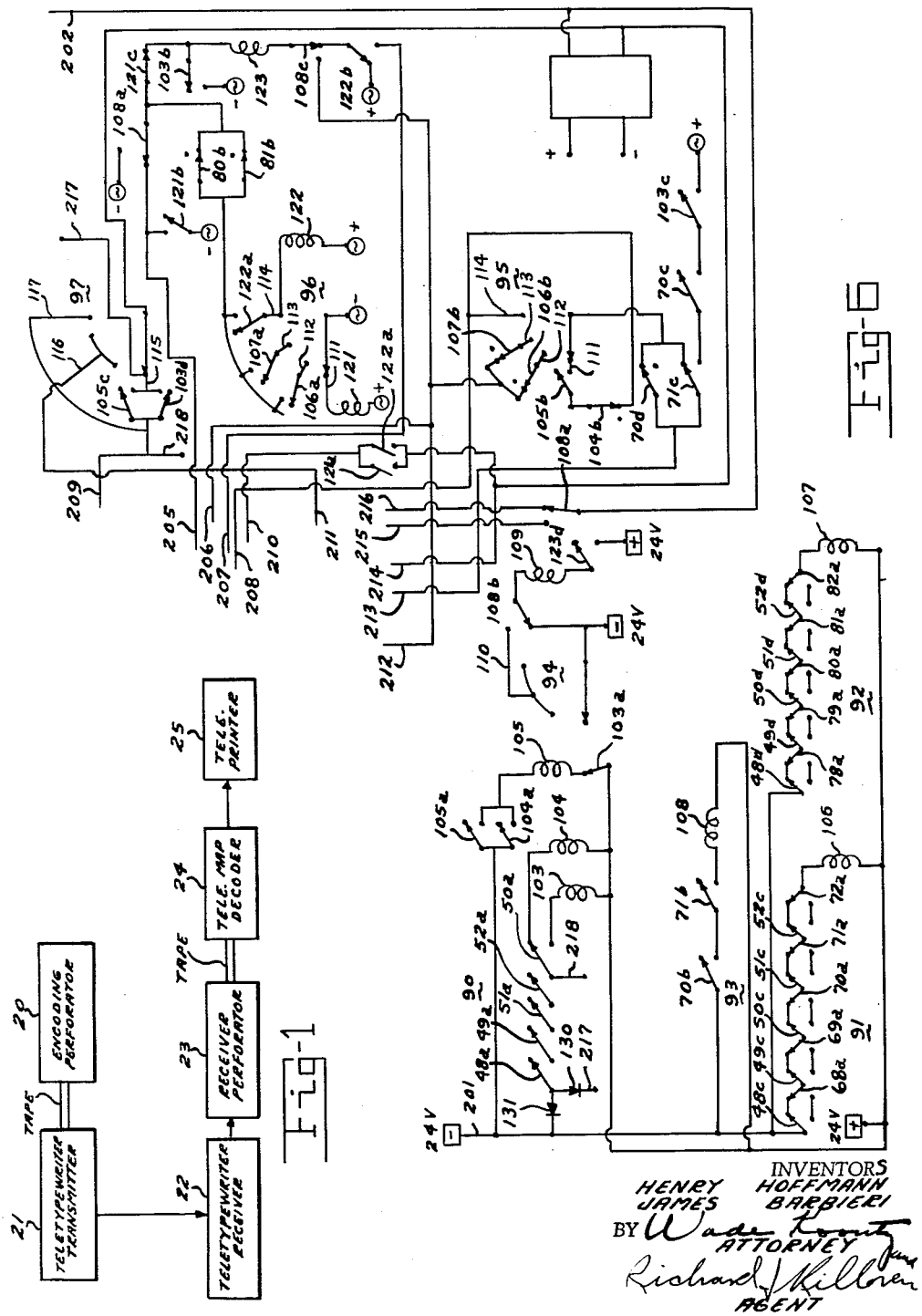
FIG. 1 is a block diagram of a teletypewriter communication system according to the invention.
Figure 2:
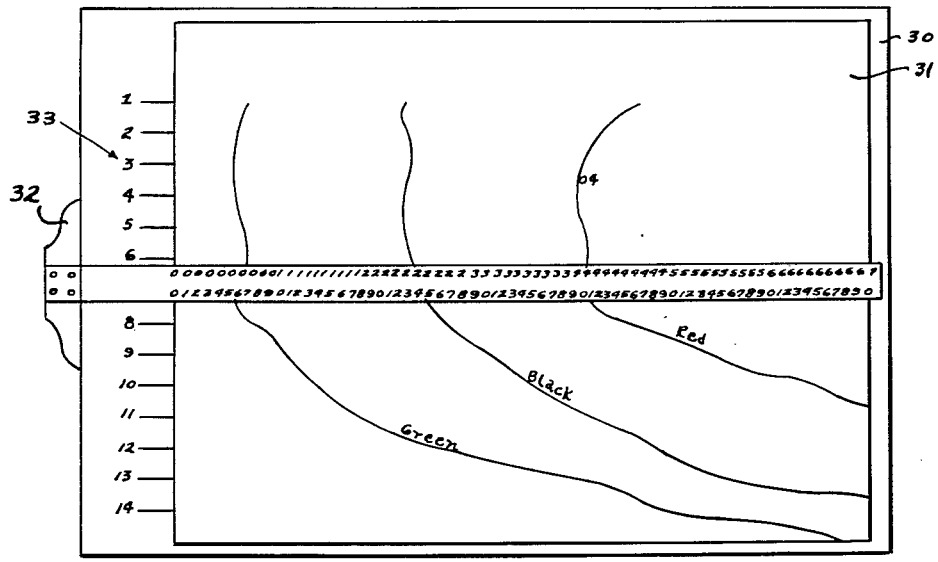
FIG. 2 shows how the coordinate overlay reader is used to convert the map coordinate information to the teletypewriter code signal.

Referring more particularly to FIG. 1, reference numeral 20 refers to an encoding perforator which may be any type of teletypewriter perforator which will cut a standard teletypewriter tape. The information which is cut on the tape by the perforator is taken from the map overlay reader shown in FIG. 2. The tape from the encoding perforator 20 is fed to a conventional teletypewriter transmitter 21 and the information is then transmitted to receiver 22 in the normal manner. The output of the receiver 22 is applied to a receiver perforator 23 which cuts a tape identical to that which was cut by the encoding perforator. The tape from the receiver perforator 23 is then fed into the tele-map decoder 24 which in turn controls the teleprinter 25 to produce a page copy sheet which is then used to reproduce the original map information on a map overlay. In the decoder, the code blocks on the tape from the receiver perforator act to control the operation of the decoder and also to provide comparison data which is compared with standard tapes to control the comparison distributor which send space pulses to the teleprinter until a complete comparison is made.

Figure 3:
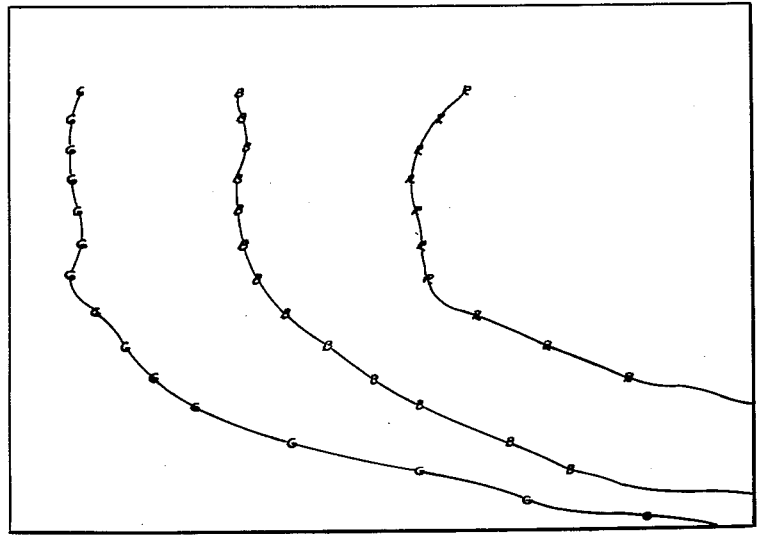
FIG. 3 is an illustration showing how the received teletypewriter information is transferred from the page copy of the teletypewriter to a map overlay to reconstruct the original line drawing.

The stepping switch for the decoder starts in position one with the decoder searching for letters recognition. Before letters recognition is achieved, the clutch coil is operated each time the brush returns to the stop segment to keep the transmitter commutator turning to advance the tape until a letters character appears at which time a letters character is sent to the teleprinter and the stepping coil is operated to step the stepping switch to the second position for tens recognition. In this position, the tens digit on the tape from the receiver perforator is compared with the tens digits corresponding to the 70 normal line spaces of a teletypewriter on the tens tape and a space pulse is sent to the teleprinter for each rotation of the comparison distributor in which a comparison is not made. When a tens comparison is made, the stepping switch is stepped to the third position to prepare the control circuit for units comparison. The comparison again sends a space pulse to the teleprinter for each rotation of the comparison distributor in which a comparison is not made. When units comparison is made, the teleprinter is at the proper position to print the letter G, B or R, whichever is the last letter in the code block, and the stepping switch is moved to position four. In the fourth position, the last letter of the code block is transmitted to the teleprinter after which the stepping switch is returned to position one for new letters recognition to begin. If identifying numbers are to be sent, for a code block representing a coordinate, figures operation takes place to transmit the identifying numbers to the teleprinter. After all of the numbers have been transmitted to the teleprinter, the end of line code acts to send a line return signal to the teleprinter and to advance the teleprinter two lines in response to the line advance characters in the end of line code. The decoder is then ready for the next line. Thus, the line information is printed in the proper position on the page copy sheet. The information from the page copy sheet taken from the teleprinter is transferred to the map overlay in the manner shown in FIG. 3. The page copy is placed under the map overlay and the like characters are connected together to reproduce the original line drawing.

Referring again to FIG. 2, reference numeral 30 refers to the board on which a line drawing 31 is mounted. The board has number reference markings 33 thereon which correspond to the normal line spaces of the teletypewriter. The T-square 32 has one edge numerically calibrated to the character spacings of a standard teletypewriter. Each contour position is represented in the transmitted signal sequentially by a code block consisting of four teletypewriter characters. The first character in the code block is the letters-character (L) for synchronization of the decoding equipment. The second character is a number character (0–9) to indicate the first digit of the coordinate. The third character is a number character (0–9) to indicate the second digit of the coordinate and the fourth is a line identifying character (A–Z). The number characters correspond to the number of character spaces from the left hand side of the line drawing to the contour line; for example, the code block for the first contour line on reference line 6 for the drawing illustrated is L06G, which means the green line is six spaces from the left hand side of the paper. The code for the whole sixth line is L06G, L24B, L40R, F04, LSFLALA. The code blocks L06G, L24B, and L40R represent the coordinate positions for the green, black and red drawing lines on reference line 6 and the F04 identifies the last line sent which is the red line in this case. The symbols LS are employed to return the teleprinter carriage and reset the decoding mechanism. The symbols FLALA are for advancing the teleprinter two lines. Starting at the top line, the T-square is advanced from line to line and the code blocks representing each contour line are cut on the teletypewriter tape by perforator 20. The encoding perforator, transmitter, receiver, receiver perforator and teleprinter are standard teletypewriter equipment.

Figure 4:
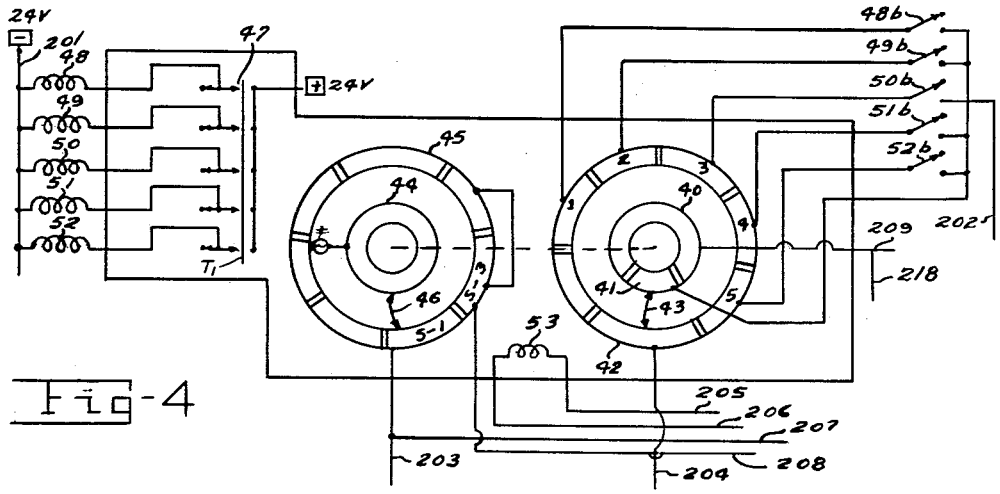
FIG. 4 is a circuit schematic of the transmitter disdistributor used in the decoder of FIG. 1.
Figure 5:
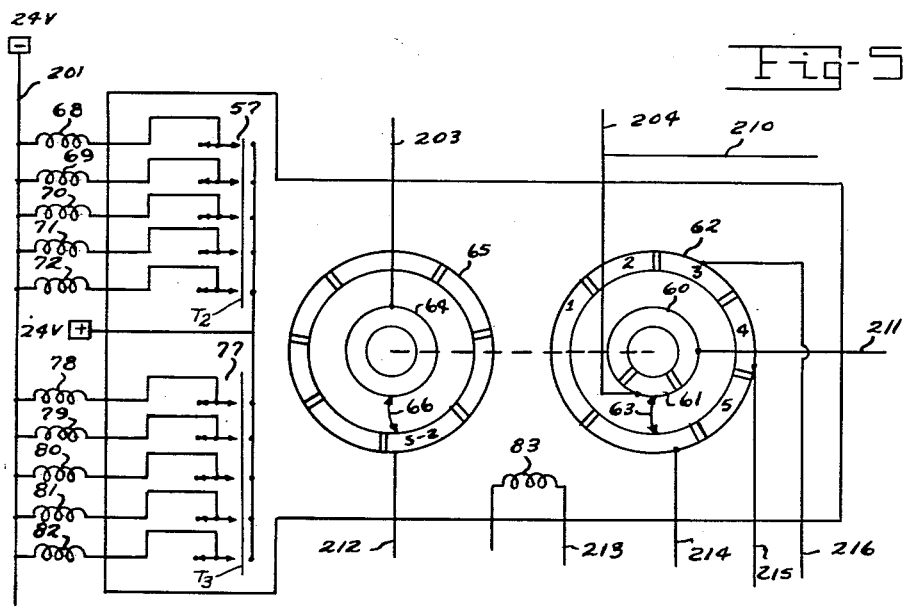
FIG. 5 is a circuit schematic showing the comparison distributor used in the decoder of FIG. 1.

The decoder consists essentially of a transmitter distributor which is shown schematically in FIG. 4, a comparison distributor which is shown schematically in FIG. 5 and a comparison and programming circuit shown schematically in FIG. 6.

Figure 4A:
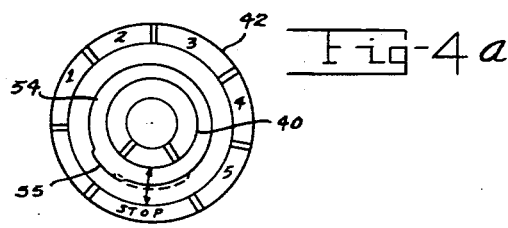
FIG. 4a shows how the cam for the transmitted distributor and camparison distributor are modified to change the time and duration of the pins down period.

The transmitter distributor, FIG. 4, is essentially a standard teletypewriter transmitter distributor which has been modified in the following manner: The inner commutator ring 40 has been cut radially to form an individual stop segment 41 with the outside ring 42 and brushes 43 being left unchanged. An additional commutator having inner ring 44, outer ring 45 and brushes 46 is mounted on top of the original commutator, though they are not shown in this manner, and brushes 43 and 46 are operated from the same shaft. The additional commutator is to provide sequential operation between the transmitter distributor, the comparison distributor and the stepping switch. The drive cam 54 shown in FIG. 4a has been rotated on the shaft relative to the brushes so that the projection 55 is in the relative position shown instead of the position shown by the dotted lines. The cam has been filed down to reduce the pins down period as can be seen from the drawing. Rotation of the cam permits the tape data to be read out in the stop position of the transmitter distributor. The pin contacts 47 are controlled by cam 54 in the usual manner to control relays 48, 49, 50, 51 and 52. The transmitter distributor also has the usual clutch coil 53.

The comparison distributor of FIG. 5 is modified in substantially the same manner as the device in FIG. 4 with the additional modification of a second tape reading mechanism being added. The comparison distributor has an inner ring 60 with a separate stop segment 61, an outer ring 62, brushes 63 and an additional commutator having an inner ring 64, an outer ring 65, brushes 66 and a cam (not shown) mounted in the same manner as in the transmitter distributor. The comparison distributor has a first tape reading mechanism having pin contacts 57 and relays 68, 69, 70, 71 and 72 and a second tape reading mechanism having pin contacts 77 and relays 78, 79, 80, 81 and 82. The comparison distributor also has the usual clutch coil 83.

The comparison and programming circuit of FIG. 6 has a letters and figures recognition circuit 90, tens comparison circuit 91, units comparison circuit 92, an end of the line recognition circuit 93 and a stepping switch having four banks of contacts 94, 95, 96 and 97.

The portions of the drawings shown in FIGURES 4, 5 and 6 are connected together by the lead lines which have the same reference characters in all of the figures.

It should be noted that the five bit teletypewriter code for the letters character is mark, mark, mark, mark and mark and the five bit code for the figures characters is mark, mark, space, mark and mark. A mark indicates that the corresponding relay is activated.

Relay contacts 48a, 49a, 51a and 52a in circuit 90, FIG. 6, are adapted to be connected in series and are normally open. These contacts will be closed if either the letters character or the figures character is being read from the transmit tape. No other teletypewriter character would activate the four relays to close these relay contacts.

If the letters character is being read, relay 50a would also be activated and thereby complete the circuit through relay 103. Actuation of relay 103 amounts to letters recognition. This relay acts to open contact 103a, and to close contacts 103b, 103c and 103d. These contacts control the read out and sequencing of the decoding circuit, as will be described later. If the figures character is being read out, relay 103 would not be activated. Relay 104 would be activated instead since relay contacts 48a, 49a, 51a and 52a would be connected in series and 50a would be inactivated and would therefore remain in its open position to complete circuit through relay 104. Relay 104 closes contacts 104a which completes the circuit through relay 105 and also opens contacts 104b. Relay 105 closes contacts 105a, 105b and 105c. Actuation of relays 104 and 105 amounts to figures recognition. Contact 105a is provided to keep the circuit through relay 105 closed even though the figures character on the tape has been advanced out of the reading position and relay 104 is deactivated. Relay 105 will remain activated until a letters character is again read off of the tape thereby activating relay 103 which opens switch 103a.

The tens comparison circuit 91 has contacts 48c, 49c, 50c, 51c and 52c controlled by relays 48, 49, 50, 51 and 52, respectively, and relay contacts 68a, 69a, 70a, 71a and 72a activated by relays 68, 69, 70, 71 and 72, respectively. Relays 48, 49, 50, 51 and 52 must be in exactly the same state as the corresponding relay of relay group 68, 69, 70, 71 and 72 for a tens comparison to be made. When a tens comparison is made, relay 106 is activated which indicates that the character on the tens tape $T_2$ is exactly the same as the character on the transmit tape $T_1$, which is the same tape as shown between receiver perforator 23 and the tele-map decoder 24 in FIG. 1.

The units comparison circuit 92 has contacts 48d, 49d, 50d, 51d and 52d controlled by relays 48, 49, 50, 51 and 52 and relay contacts 78a, 79a, 80a, 81a and 82a controlled by relays 78, 79, 80, 81 and 82. In this case relays 48, 49, 50, 51 and 52 must be in exactly the same state as the corresponding relay of relay group 78, 79, 80, 81 and 82 for a units comparison to be made. When the units comparison is made, relay 107 is activated which indicates that the character on the units $T_3$ tape is exactly the same as the character on the transmit tape $T_1$.

Figure 7:
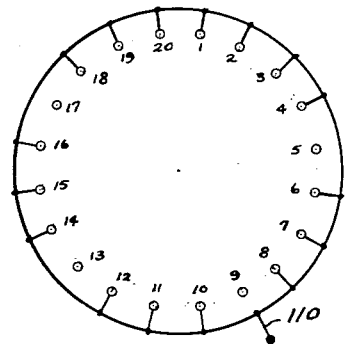
FIG. 7 shows a first step switch used in the comparison and programming circuit of FIG. 6.
Figure 8:
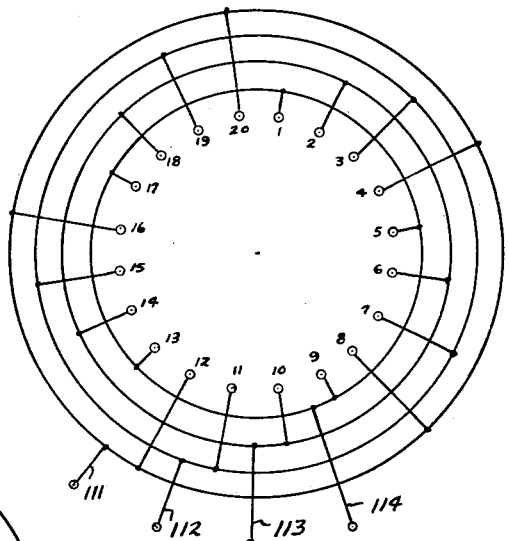
FIG. 8 is a second step switch used in the comparison and programming circuit of FIG. 6.
Figure 9:
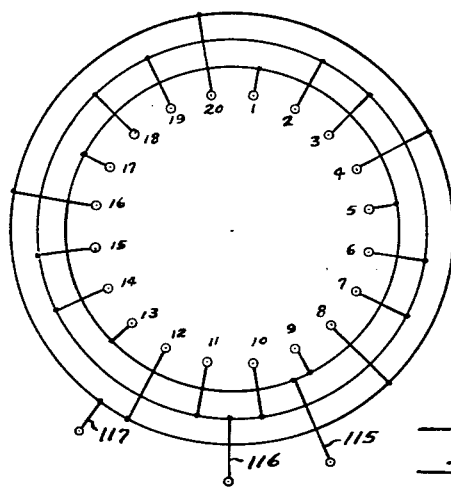
FIG. 9 is a third step switch used in the comparison and programming circiut of FIG. 6.
Figure 10:
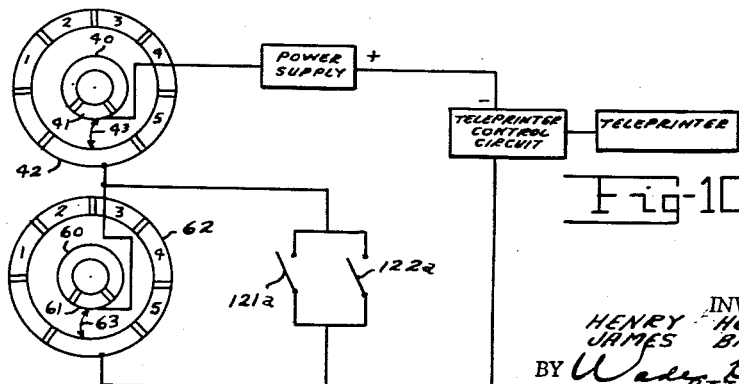
FIG. 10 is a circuit schematic showing the stop pulse operation for the decoder of FIG. 1.

The end of the line recognition circuit 93 has relay contacts 70b and 71b controlled by relays 70 and 71 of the tens comparison circuit. At the end of tens tape sequence is a character "N" for which the teletypewriter characters are space, space, mark, mark, space which activates relays 70 and 71. A relay 108 is connected in series with contacts 70b and 71b and activation of this relay constitutes end of line recognition. There is no other character on the tens tape in which the mark appears in the third and fourth digit and the "N" character is therefore the only character that can activate relay 108. This character N is the 71st character on the tens tape so that the teletypewriter can only print up to 70 character spaces on a line. There is also an N character at the end of the units tape to open relay contacts 80b and 81b. The stepping switches 94, 95, 96 and 97, though shown as four position switches in FIG. 6, are actually 20 position switches as illustrated in FIGS. 7, 8 and 9. The contacts are connected together in such a manner as to make these switches in effect four position switches. Though 20 position switches have been used, a switch with positions equal to any multiple of four could be used. Switch 94 is illustrated in FIG. 7. Switches 95 and 96 are the same and are illustrated in FIG. 8 and switch 97 is illustrated in FIG. 9. The switch of FIG. 7 has every fourth contact open and all of the other contacts connected to a common lead 110. The switch of FIG. 8 has each contact group connected to a separate lead 111, 112, 113 and 114. The switch of FIG. 9 has switch positions 1, 5, 9, 13 and 17 connected to lead 115, contacts 2, 3, 6, 7, 10, 11, 14, 15, 18 and 19 connected to lead 116 and contacts 4, 8, 12, 16 and 20 connected to lead 117. The stepping switch is controlled by stepping coil 109. Stepping of the switch is accomplished by deactivating the stepping coil 109 in the usual manner. Three 115 volt relays 121, 122 and 123 are provided to further control the operation of the circuit, as will be explained in the detailed description of such operation.

In the operation of the apparatus, the map coordinate information is read off of the map by means of the map coordinate overlay reader 32 and is put onto a standard teletypewriter tape in the form of code blocks by the teletypewriter encoding perforator 20. This tape is then fed to a teletypewriter transmitter 21 wherein the information is transmitted to a distant receiver 22. The received information is applied to the receiver perforator 23 which cuts a tape which corresponds to the tape which was cut at the transmitting station. This tape is then fed to the teletypewriter map decoder to decode the basic code block. The decoder then acts to control the teleprinter.

The stepping switch starts in position one with the decoder searching for letters recognition. With the stepping switch in this position, relay 121 is activated to close switch 121a which shorts out the comparison distributor stop segments. Switch 121b is also closed to complete the circuit through lead 205, clutch coil 53, leads 206 and 212, commutator switch S-2, lead 203 and switch S-1 to the positive supply connected to ring 44. This allows the transmitter commutator to turn and advance the transmit tape. The comparison distributor clutch coil 83 and relay 123 remain deactivated. When a letters character appears at the pins-up position of the commutator, letters recognition is obtained and relay 103 is activated. This in turn activates relay 123 thereby closing switch 123a which permits the stepping switch coil 109 to be activated. The transmitter distributor continues to rotate thereby transmitting the letters character to the teleprinter through relay contacts 48b, 49b, 50b, 51b and 52b. At the pins-down position, letters recognition disappears which deactivates relay 103 and in turn relay 123 thereby deactivating stepping switch coil 109 so that the stepping switch advances to position 2. The readout circuit for the transmitter distributor commutator is shown in FIG. 11. In order to read out the character to the teleprinter from the transmit tape sequentially, the commutator segments 1 through 5 have been wired in series with the relay contacts 48b, 49b, 50b, 51b and 52b, respectively. The other contacts of these relay switches are connected together and to the teleprinter over line 202. The inner commutator segment 40 has been wired to stepping switch 97, such that there will be continuity to the other terminal of the teleprinter in position 4 and also in position 1, if letters or figures recognition exists as can be seen from FIG. 11. The relay contacts 48a, 49a, 51a and 52a, employed for both letters and figures recognition, have been placed in parallel with relay contacts 103d and 105d through isolating diodes 130 and 131 to separate 115 volt A.C. supply from 24 volt D.C. supply. Functionally this parallel connection is not necessary; however, the time delay in activating relays 103 and 105 through relays 48, 49, 50, 51 and 52 was too long and it was found experimentally that the initial bauds of the figures and letters characters transmitted to the teleprinter were being missed. Thus, by connecting these switches in parallel, the circuit to the teleprinter is completed through switches 48a, 49a, 51a and 52a and current flows through this circuit until either 103d or 105d is closed.

At the next pins-up position after the stepping switch has stepped to position 2, the first digit in the code block appears. When the transmitter distributor reaches the stop position the clutch is not activated so the distributor stops. The second cycle of tens comparison is now ready to begin.

If comparison is made immediately, relay 106 is operated thereby closing contacts 106a to complete the circuit through the transmitter distributor clutch coil. The transmitter distributor then would not stop but would continue to rotate to advance the transmit tape in the second digit of the code block. Relay 123 will also be activated and deactivated so that the stepping switch will be advanced to position 3.

If the comparison is not made immediately, the transmitter distributor will be stopped and the comparison distributor will begin to rotate by the activation of clutch coil 83, through switch contacts 106b and switches S-1 and S-2. At the pins-up position on the comparison distributor a new digit would be read from the tens tape and compared with the first digit on the transmit tape in the tens comparison circuit. The comparison distributor will continue to rotate until a tens comparison is made. When a comparison is made, relay 106 will be activated and the stepping switch will be stepped to position 3 as has been described previously. Each time the comparison distributor is rotated a space character is transmitted to the teleprinter as can be seen from FIG. 12. When the comparison is made, transmit tape is advanced to the next symbol containing the unit coordinates and the stepping switch is advanced to position 3 as has been described previously. The units comparison is then made in the units comparison circuit in the same manner that the tens comparison is made. After the units comparison is made, the circuit through clutch coil 53 is completed through 107a and relay 123 is activated and deactivated which in turn steps the stepping switch to position 4 which activates relay 122 thereby closing switch 122a to short out the comparison distributor stop segments. When the transmitter distributor reaches commutator switch S-3 comparison distributor starts to rotate since the clutch coil 83 is energized through the fourth contact of stepping switch 95. When the transmitter distributor reaches the stop position it stops because the commutator switch S-2 is open due to the rotation of the comparison distributor. Relay 123 is energized through position 4 of stepping switch 96 and relay contact 122b thereby activating a stepping switch coil 109. When the comparison distributor reaches the stop position it stops and allows the transmitter distributor to start. After the transmitter distributor moves off the commutator switch S-1, relay 123 deactivates and in turn the stepping switch is stepped to position 1. This completes the sequence and a search for a new letters recognition begins. As can be seen from FIG. 11, the last letter in the fourth digit code block is transmitted to the teleprinter when the stepping switch is in position 4.

After a code block representing a coordinate has been printed, the next operation of the decoder may be figures operation to transmit the identifying number to the teleprinter. When figures recognition occurs, relays 104 and 105 will be actuated. Relay 105 will remain activated even after 104 is deactivated as has been described previously. Since relay 103 is not activated upon figures recognition the circuit is open through relay 123 as both switches 121c and 103b are open in position 1 of the stepping switch and the stepping switch will not be activated to advance the stepping switch to the other three positions. Relay contact 105c completes the circuit to the teleprinter so that the figures character and all of the numbers following it are transmitted to the teleprinter. The circuit to the comparison distributor stepping coil 83 is completed through switch 105b so that the comparison distributor will advance the same number of spaces as there are number characters on the transmit tape so that the tens and units tape will advance the same number of spaces as the teleprinter. Relay contact 104b will open the circuit to the comparison distributor stepping coil when coil 104 is operated so that the comparison distributor will not advance one space while the figures recognition character is being transmitted to the teleprinter.

After all the coordinates and numbers on a particular line have been transmitted to the teleprinter by the decoder, the end of the line code LSFLALA are received. The following operation will then occur upon recognition of the letters character. Stepping switch will advance to position 2 and the transmitter tape will advance to the space symbol S. The comparison distributor will then start advancing to attempt to perform the tens recognition. As the tape advances, space symbols are transmitted to the teleprinter. As comparison is impossible the end of the tens tape is finally reached. The N character on the tens tape appears which activates relays 70 and 71 thereby closing relay contacts 70b and 71b which in turn energizes relay 108. Relay contact 108a is then switched to connect the comparison distributor segment 4 to the teleprinter and a line return symbol is thus transmitted to the teleprinter as can be seen from FIG. 12. Relay contact 108b is connected to lead 110 and the stepping switch is thereby returned to position 1 as the circuit is completed and broken due to the action of relay 109 and stepping switch 94. The transmitter distributor is then advanced to the next character since switch 121b is closed when the stepping switch is in position 1, thereby bringing about figures recognition. The normal figures operation then takes place and the two line advance characters are then transmitted to the teleprinter. The decoder is then ready to decode the next line of the tele-map.

There is thus provided a system for transmitting line drawing data such as map information over standard teletypewriter communication facilities which require much less time than conventional systems.

Though one specific embodiment of the invention has been described in some detail, it is obvious that numerous changes may be made without departing from the general principles and scope of the invention.

What is claimed is:

1. A device for transmitting map coordinate information over teletypewriter communication facilities, comprising: means for converting the map coordinate information into teletypewriter code information representing the coordinate position of the information to be sent, means for transmitting said information to a receiver, a teleprinter, means for comparing the received information with standard teleprinter space information, and means for controlling the spacing and printing operation of said teleprinter in response to the compared information and the received information to produce the original map coordinate information.

2. A device for transmitting map coordinate information over teletypewriter communication facilities, comprising: means for converting the map coordinate information into teletypewriter code information representing the coordinate position of the information to be sent, means for transmitting said information to a receiver, means for perforating a tape at said receiver in response to the received information, a teleprinter, and means for comparing the information on said perforated tape with a pair of standard tapes to control the spacing and printing operation of said teleprinter to produce the original map coordinate information.

3. A device for transmitting map coordinate information over teletypewriter communication facilities, comprising; means for converting the map coordinate information into teletypewriter code information representing the coordinate position of the information to be sent, means for transmitting said information to a receiver, means for perforating a tape at said receiver in response to the received information, a decoder circuit, means for applying said information to said decoder circuit, a teleprinter, means within said decoder circuit for comparing the information on said perforated tape with a pair of standard tapes to control the spacing and printing operation of said teleprinter to reproduce the original map information.

4. A device for transmitting map coordinate information over teletypewriter communication facilities, comprising; means for converting the map coordinate information into teletypewriter code information representing the coordinate position of the information to be sent, means for transmitting said information to a receiver, means for perforating a tape at said receiver in response to the received information, a teleprinter, and means for comparing the information on said perforated tape with a pair of standard tapes having teletypewriter space information thereon, means for transmitting a space signal to said teleprinter for each unsuccessful attempted comparison to move the teleprinter to the coordinate position indicated by the information on the perforated tape, and means for transmitting a letter printing signal to said teleprinter in response to contour line identifying character information on said perforated tape.

5. A device for transmitting map coordinate information over teletypewriter communication facilities, comprising; means for converting the map coordinate information into teletypewriter code information representing the coordinate position of the information to be sent, means for transmitting said information to a receiver, means for perforating a tape at said receiver in response to the received information, a transmitter distributor for reading the information from said perforated tape, a teleprinter, a first circuit for transmitting the information read by said transmitter distributor to said teleprinter, said first circuit having a switch therein, a pair of standard tapes having teletypewriter space information thereon, means for comparing the information read by said transmitter distributor with said information on said standard tapes, means for transmitting a space signal to said teleprinter for each unsuccessful attempted comparison to move the teleprinter to the coordinate position indicated by the information on said perforated tape, a letters and figures recognition circuit, means responsive to the output of said figures recognition circuit for controlling the switch in said first circuit to print the information presented to said transmitter distributor and means responsive to said letters recognition circuit for controlling the switch in said first circuit to delay printing of information presented at said reading contacts until the teleprinter has been stepped to the proper coordinate position by said space means.

6. A device for transmitting map coordinate information over teletypewriter communication facilities, comprising; means for converting the map coordinate information into teletypewriter code information representing the coordinate position of the information to be sent, means for transmitting said information to a receiver, means for perforating a tape at said receiver in response to the received information, a transmitter distributor, means within said transmitter for reading the information on the perforated tape, a comparison distributor, a first and a second tape readout device within said comparison distributor, a first standard tape located in readout relation to said first readout device, a second standard tape located in readout relation to said second readout device, a letters and a figures recognition circuit, means for comparing said first tape with a first bit of information on said perforated tape means for producing a space character for transmission to a teleprinter for each unsuccessful attempted comparison, means responsive to a successful comparison for conditioning the circuit for comparing a second bit of information on said perforated tape with said second standard tape, means for producing a space character for transmission to a teleprinter for each unsuccessful attempted comparison between said second tape and said perforated tape, means for conditioning the decoder circuit for transmitting a third bit of code information from the perforated tape to the teleprinter after the two successful comparisons have been made and means for returning the decoder to its original condition after said third bit of information has been transmitted to the teleprinter.

7. A device for transmitting map coordinate information over teletypewriter communication facilities, comprising; means for converting the map coordinate information into teletypewriter code information representing the coordinate position of the information to be sent, means for transmitting said information to a receiver, means for perforating a tape at said receiver in response to the received information to produce a transmit tape, a transmit distributor, a transmit tape readout device within said transmit distributor, a comparison distributor, a first and second tape readout device within said comparison distributor, a first standard tape located in readout relation with said first readout device, a second standard tape located in readout location with said second readout device, means for comparing said first tape with a first bit of information on said transmit tape, means for producing a space character for transmission to a teleprinter for each unsuccessful attempted comparison, means responsive to a successful comparison for conditioning the circuit for comparing a second bit of information on said transmit tape with said second standard tape, means for producing a space character for transmission to a teleprinter for each unsuccessful attempted comparison between said second tape and said transmit tape, means for conditioning the circuit for transmitting a third bit of code information from the transmit tape to the teleprinter after the two successful comparisons have been made and means for returning the decoder to its original condition after said third bit of information has been transmitted to the teleprinter, a letters and a figures recognition circuit, means responsive to an output from said letters recognition circuit for opening the circuit between said transmitter distributor and said teleprinter until said comparisons have been made and means responsive to an output from said figures recognition to condition the circuit between transmitter distributor and said teleprinter to pass the information following the figures character directly to the teleprinter.

8. A device for decoding teletypewriter map contour code information comprising, a teleprinter, a pair of standard tapes having teletypewriter space information thereon, means for comparing the information on said standard tapes with said teletypewriter map contour code information, means for transmitting a space signal to said teleprinter for each unsuccessful attempted comparison to move the teleprinter to the coordinate position indicated by said teletypewriter map contour information and means for transmitting a printing signal to said teleprinter to print a contour line identifying character at said coordinate position.

9. A device for decoding teletypewriter map contour code information, comprising; a pair of standard tapes with teletypewriter space information thereon, means for receiving a code tape with the code information thereon, means for comparing the information on said code tape with the information on said standard tapes, a teleprinter, means for transmitting a space signal to said teleprinter for each unsuccessful attempted comparison to move the teleprinter to the coordinate position indicated by the information on said code tape, means for transmitting a letter character printing signal to said teleprinter in response to contour line identifying information on said perforated tape.

10. A device for decoding teletypewriter map contour code information comprising a transmitter distributor having one set of reading contacts, a teleprinter, a first circuit for transmitting the information presented at said contacts, to said teleprinter, said first circuit having a switch therein, a pair of standard tapes having teleprinter space information thereon, means for comparing the information presented to said transmitter distributor with said information on said standard tapes, means for transmitting space signals to said teleprinter for each unsuccessful attempted comparison to move the teleprinter to the coordinate position indicated by the information presented to the reading contacts, a letters and figures recognition circuit, means responsive to the output of said figures recognition circuit for controlling the switch in said first circuit to print the informaton presented at said reading contacts and means responsive to said letters recognition circuit for controlling the switch in said first circuit to delay printing of informaton presented at said reading contacts until the teleprinter has been stepped to the proper coordinate position by said space means.

11. A device for decoding teletypewriter map contour code information, comprising; a transmit distributor, a transmit tape readout device within said transmit distributor, a comparison distributor, a first and a second tape readout device within said comparison distributor, a first standard tape located in readout relation to said first readout device, a second standard tape located in readout relation to said second readout device, means for comparing said first tape with a first bit of information on said transmit tape, means for producing a space character for transmission to a teleprinter for each unsuccessful attempted comparison, means responsive to a successful comparison for conditioning the circuit for comparing a second bit of information on said transmit tape with said second standard tape, means for producing a space character for transmission to a teleprinter for each unsuccessful attempted comparison between said second tape and said transmit tape, means for conditioning the decoder circuit for transmitting a third bit of code information from the transmit tape to the teleprinter after the two successful comparisons have been made and means for returning the decoder to its original condition after said third bit of information has been transmitted to the teleprinter.

12. A device for decoding teletypewriter map code information, comprising; a transmit distributor, a transmit tape readout device within said transmit distributor, a comparison distributor, a first and second tape readout device within said comparison distributor, a first standard tape located in readout relation to said first readout device, a second standard tape located in readout relation to said second readout device, means for comparing said first tape with a first bit of information on said transmit tape, means for producing a space character for transmission to a teleprinter for each unsuccessful attempted comparison, means responsive to a successful comparison for conditioning the circuit for comparing a second bit of information on said transmit tape with said second standard tape, means for producing a space character for transmission to a teleprinter for each unsuccessful attempted comparison between said second tape and said transmit tape, means for conditioning the decoder circuit for transmitting a third bit of code information from the transmit tape to the teleprinter after the two successful comparisons have been made and means for returning the decoder to its original condition after said third bit of information has been transmitted to the teleprinter, a letters and figures recognition means responsive to an output from said letters recognition circuit for opening the circuit between said transmitter distributor and said teleprinter until said comparison has been made and means responsive to an output from said figures recognition to condition the circuit between transmitter distributor and said teleprinter to pass the information following the figures character directly to the teleprinter.

13. A device for decoding teletypewriter map code information, comprising; a transmit distributor, a transmit tape readout device within said transmit distributor, a comparison distributor, a letters and figures recognition circuit, a first and a second tape readout device within said comparison distributor, a first standard tape located in readout relation to said first readout device, a second standard tape located in readout relation to said second readout device, a four bank, four position switch, means responsive to an output from said letters recognition circuit to move said switch to its second position to condition the decoder circuit for making a first comparison, means for comparing said first tape with a first bit of information on said transmit tape, means for producing a space character for transmission to a teleprinter for each unsuccessful attempted comparison, means responsive to a successful comparison for moving the four position switch to its third position to condition the circuit for comparing a second bit of information on said transmit tape with said second standard tape, means for producing a space character for transmission to a teleprinter for each unsuccessful attempted comparison between said second tape and said transmit tape, means for moving the four position switch to its fourth position to condition the decoder circuit for transmitting a third bit of code information from the transmit tape to the teleprinter after the two successful comparisons have been made, means for returning the four position switch to its first position after said third bit of information has been transmitted to the teleprinter and means responsive to an output from said figures recognition circuit to condition the circuit between the transmitter distributor and said teleprinter to pass the information following the figures character directly to the teleprinter.

References Cited in the file of this patent

UNITED STATES PATENTS

| | | |
|---|---|---|
| 1,491,385 | Pfannenstiehl | Apr. 22, 1924 |
| 1,581,937 | Leishman | Apr. 20, 1926 |
| 1,713,025 | Castleman | May 14, 1929 |
| 2,581,961 | Lake | Jan. 8, 1952 |
| 2,799,937 | Lewis | July 23, 1957 |
| 2,827,623 | Ainsworth | Mar. 18, 1958 |